US011355804B2

United States Patent
Hirschbeck et al.

(10) Patent No.: US 11,355,804 B2
(45) Date of Patent: Jun. 7, 2022

(54) REMOVABLE BATTERY COMPONENT CARRIER, BATTERY SYSTEM INCLUDING REMOVABLE BATTERY COMPONENT CARRIERS AND VEHICLE INCLUDING THE BATTERY SYSTEM

(71) Applicant: Samsung SDI Co., Ltd., Yongin-si (KR)

(72) Inventors: Marco Hirschbeck, Graz (AT); Seongjoon Park, Graz (AT); Ralph Wuensche, Graz (AT); Stephan Klomberg, Graz (AT); Thomas Brandner, Rosental (AT); Thomas Renger, Hitzendorf (AT); Jörg Killmann, Graz (AT); Miran Kojc, Maribor (SI)

(73) Assignee: SAMSUNG SDI CO., LTD., Yongin-si (KR)

(*) Notice: Subject to any disclaimer, the term of this patent is extended or adjusted under 35 U.S.C. 154(b) by 346 days.

(21) Appl. No.: 16/466,942

(22) PCT Filed: Dec. 5, 2017

(86) PCT No.: PCT/KR2017/014121
§ 371 (c)(1),
(2) Date: Jun. 5, 2019

(87) PCT Pub. No.: WO2018/105981
PCT Pub. Date: Jun. 14, 2018

(65) Prior Publication Data
US 2019/0296294 A1    Sep. 26, 2019

(30) Foreign Application Priority Data

Dec. 5, 2016  (EP) .................... 16202176
Dec. 4, 2017  (EP) .................... 17205068

(51) Int. Cl.
*H01M 50/20* (2021.01)
*H01M 10/6556* (2014.01)
(Continued)

(52) U.S. Cl.
CPC ............. *H01M 50/20* (2021.01); *B60L 50/64* (2019.02); *H01M 10/6556* (2015.04); *H01M 50/502* (2021.01); *H01M 2220/20* (2013.01)

(58) Field of Classification Search
CPC ............. H01M 50/20; H01M 10/6556; H01M 50/502; H01M 2220/20; B60L 50/64
See application file for complete search history.

(56) References Cited

U.S. PATENT DOCUMENTS 6,864,013 B2    3/2005   Gow et al.
9,056,361 B2    6/2015   Ohata et al.
(Continued)

FOREIGN PATENT DOCUMENTS

CN    102110795 A    6/2011
CN    102473884 A    5/2012
(Continued)

OTHER PUBLICATIONS

EPO Office Action dated Jan. 3, 2020, for corresponding European Patent Application No. 17205068.4 (5 pages).
(Continued)

*Primary Examiner* — Sarah A. Slifka
(74) *Attorney, Agent, or Firm* — Lewis Roca Rothgerber Christie LLP

(57) ABSTRACT

A removable battery component carrier (30,60) for accommodating a battery submodule (40,64) and configured to be mechanically and electrically connected to other removable battery component carriers (30,60) and/or to a carrier frame is provided. The removable battery component carrier (30, 60) comprises a bottom plate (32,62), a pair of side walls
(Continued)

(31) extending upward from the bottom plate (32,62) along two longitudinal edges of the bottom plate (32,62), a pair of end plates (33) extending upwards from the bottom plate (32,62) along two transversal edges of the bottom plate (32,62). The end plates (33) are mechanically coupled to the side walls (31) and/or to the bottom plate (32,62) to fix battery cells (1,1') together. A cell cover (34,66) extends parallel to the bottom plate (32,62) so that the cell cover, the bottom plate, the side walls, and the end plates form an accommodating space for the battery submodule (40,64).

15 Claims, 4 Drawing Sheets

(51) Int. Cl.
  *B60L 50/64* (2019.01)
  *H01M 50/502* (2021.01)

(56) References Cited

U.S. PATENT DOCUMENTS

| | | |
|---|---|---|
| 2008/0118819 A1 | 5/2008 | Gamboa et al. |
| 2010/0301807 A1 | 12/2010 | Gamboa et al. |
| 2011/0135992 A1 | 6/2011 | Kim et al. |
| 2011/0206948 A1 | 8/2011 | Asai et al. |
| 2011/0293974 A1 | 12/2011 | Yoon et al. |
| 2011/0294000 A1 | 12/2011 | Kim et al. |
| 2012/0164490 A1 | 6/2012 | Itoi et al. |
| 2012/0188714 A1 | 7/2012 | Von Borck et al. |
| 2012/0224326 A1 | 9/2012 | Kohlberger et al. |
| 2013/0200700 A1 | 8/2013 | Ohkura et al. |
| 2013/0288096 A1 | 10/2013 | Frutschy et al. |
| 2014/0199574 A1 | 7/2014 | Fink |
| 2014/0212713 A1 | 7/2014 | Yang et al. |
| 2014/0295235 A1 | 10/2014 | Jung |
| 2014/0302371 A1 | 10/2014 | Miyawaki et al. |
| 2015/0042158 A1 | 2/2015 | Schmidt et al. |
| 2016/0211561 A1 | 7/2016 | Nakagawa et al. |
| 2016/0276638 A1 | 9/2016 | Sham |
| 2016/0344071 A1 | 11/2016 | Zheng et al. |
| 2017/0005371 A1 | 1/2017 | Chidester et al. |
| 2017/0012269 A1 | 1/2017 | Grzywok et al. |
| 2017/0098802 A1 | 4/2017 | Lee et al. |
| 2017/0229683 A1 | 8/2017 | Snyder et al. |
| 2017/0365888 A1 | 12/2017 | Kwon et al. |
| 2017/0373289 A1 | 12/2017 | Lee et al. |
| 2018/0019508 A1 | 1/2018 | Lee et al. |
| 2021/0273285 A1 | 9/2021 | Bluemel |

FOREIGN PATENT DOCUMENTS

| | | |
|---|---|---|
| CN | 102576831 A | 7/2012 |
| CN | 202712293 U | 1/2013 |
| CN | 103717433 A | 4/2014 |
| CN | 104064721 A | 9/2014 |
| CN | 104103871 A | 10/2014 |
| CN | 105977417 A | 9/2016 |
| CN | 106560936 A | 4/2017 |
| CN | 206471396 U | 9/2017 |
| CN | 206558567 U | 10/2017 |
| EP | 2 362 463 A2 | 8/2011 |
| ES | 1065338 U | 8/2007 |
| JP | 2011-119222 A | 6/2011 |
| KR | 10-2012-0005727 A | 1/2012 |
| KR | 10-1156527 B1 | 6/2012 |
| KR | 10-2013-0080144 A | 7/2013 |
| KR | 10-1382011 B1 | 4/2014 |
| KR | 10-2014-0118734 A | 10/2014 |
| KR | 10-1501026 B1 | 3/2015 |
| KR | 10-2016-0115582 A | 10/2016 |
| KR | 10-2016-0135344 A | 11/2016 |
| KR | 10-2017-0014924 A | 2/2017 |

OTHER PUBLICATIONS

EPO Office Action dated Sep. 25, 2019, for corresponding European Patent Application No. 16202176.0 (5 pages).
Extended European Search Report for corresponding European Patent Application No. 17205068.4, dated Jan. 19, 2018, 9pp.
Extended European Search Report for corresponding European Patent Application No. 16202176.0, dated Feb. 9, 2017, 7pp.
Office action for corresponding European Patent Application No. 16202176.0, dated Apr. 11, 2019, 6pp.
International Search Report for corresponding International Application No. PCT/KR2017/014121, dated Mar. 22, 2018, 4pp.
U.S. Office Action dated Oct. 20, 2020, issued in U.S. Appl. No. 16/466,899 (19 pages).
European Patent Office Action for corresponding European Patent Application No. 17 205 068.4, dated Aug. 7, 2020, 4 pages.
U.S. Advisory Action dated Apr. 22, 2021, issued in U.S. Appl. No. 16/466,899 (3 pages).
U.S. Office Action dated Jun. 1, 2021, issued in U.S. Appl. No. 16/466,899 (11 pages).
U.S. Final Office Action dated Feb. 24, 2021, issued in U.S. Appl. No. 16/466,899 (10 pages).
International Search Report for International Application No. PCT/KR2017/014002 dated Mar. 19, 2018, 7pp.
Chinese Office Action dated Aug. 9, 2021, issued in corresponding Chinese Patent Application No. 201780084989.0 (9 pages).
Chinese Office Action dated Aug. 10, 2021, issued in corresponding Chinese Patent Application No. 201780084975.9 (8 pages).
U.S. Notice of Allowance dated Oct. 27, 2021, issued in U.S. Appl. No. 16/466,899 (8 pages).
European Summons to Oral Proceedings issued in corresponding application No. EP17205068.4, dated Apr. 19, 2022, 10 pages.
Chinese Office Action issued in corresponding application No. CN 201780084975.9, dated Apr. 22, 2022, 14 pages.
Chinese Office action issued ini corresponding application No. CN 201780084989.0, dated Apr. 24, 2022, 15 pages.

REMOVABLE BATTERY COMPONENT CARRIER, BATTERY SYSTEM INCLUDING REMOVABLE BATTERY COMPONENT CARRIERS AND VEHICLE INCLUDING THE BATTERY SYSTEM

CROSS-REFERENCE TO RELATED APPLICATION(S)

This application is a National Phase Patent Application of International Patent Application Number PCT/KR2017/014121, filed on Dec. 5, 2017, which claims priority to European Patent Application No. 16202176.0, filed Dec. 5, 2016, and European Patent Application No. 17205068.4, filed Dec. 4, 2017. The entire contents of all of which are incorporated herein by reference.

TECHNICAL FIELD

The present invention relates to a removable battery component carrier, a battery system including a plurality of removable battery component carriers which can be individually detached from the battery system and a vehicle including the battery system.

BACKGROUND ART

Rechargeable or secondary batteries that can be repeatedly charged and discharged are widely used in many different devices. While low-capacity rechargeable batteries are generally used as power supply for small electronic devices, such as cellular phones, notebook computers and camcorders, high-capacity rechargeable batteries are mostly used as power supply for hybrid vehicles and the like.

In general, rechargeable batteries include an electrode assembly including a positive electrode, a negative electrode, and a separator interposed between the positive and negative electrodes, a case accommodating the electrode assembly, and an electrode terminal electrically connected to the electrode assembly. The shape of the case, e.g. cylindrical or rectangular, may be varied according to the intended purpose and design of the device.

Battery modules comprising a plurality of unit battery cells coupled in series and/or in parallel are used to provide the required energy density. The battery module is formed by interconnecting the electrode terminals of the plurality of unit battery cells, wherein the number of unit cells depends on the required amount of power.

Battery modules can be construed either in a block design or in a modular design. In a block designs each battery cell is coupled to a common current collector structure and a common battery management system. In modular designs, a plurality of battery cells connected to each other forms a submodule and several submodules are connected to each other to form the module. In the latter case, the battery management functions can be realized either on the module or on the submodule level and thus interchangeability might be improved.

A plurality of battery modules can be combined in order to realize a high-power rechargeable battery, e.g. for an electric or hybrid vehicle. One or more battery modules are then mechanically and electrically integrated, equipped with a thermal management system and set up for communication with one or more electrical consumers in order to form a battery system. The thermal management system is required to ensure safety and efficiency of the battery module by dissipating heat generated from the rechargeable batteries.

The mechanical integration of a battery system requires appropriate mechanical connection of the individual components, e.g. of battery submodules among themselves and with a structure of the system providing the electrical consumers, e.g. a vehicle. These connections must be designed to remain functional during the average service life of the battery system and under the stresses provided during its use. At the same time installation space and interchangeability requirements must be met.

Mechanical integration of battery modules can be achieved by providing a carrier plate, e.g. a bottom plate, and by positioning individual battery cells or submodules thereon. Fixing the battery cells or submodules can be achieved e.g. by fitted depressions in the carrier plate, by mechanical interconnectors as bolts or screws or by confining the cells or submodules. Confinement can be achieved by fastening side plates to lateral sides of the carrier plate. Additionally or alternatively the submodules can be arranged in individual casings arranged into a battery module, e.g. onto a carrier plate, within these individual casings.

Battery modules according to the prior art, despite any modular structure, achieve their mechanical integrity by the interconnections of all its constituting parts. Thus, replacement of a part of the battery module, e.g. a submodule, usually requires dismounting the whole battery module. Hence, defects in a component of a battery module usually lead to dismounting and replacement of the complete module and a separate repair of the module. As high-capacity battery modules might be expensive, large and heavy, said procedure proves burdensome and the storage, e.g. in the mechanic's workshop, of the bulky battery modules becomes difficult.

DISCLOSURE

It is an object of the present invention to provide a removable battery carrier component configured for accommodating and protecting a battery submodule and configured to be mechanically and electrically connected to other removable battery component carriers and/or to a carrier frame to form a modular battery system.

It is a further object of the present invention to provide a removable battery carrier component comprising cooling channels for dissipating heat generated by the battery submodule and configured to be connected to the cooling channels of the neighboring removable battery component carriers and of the carrier frame to form an overall cooling channel running through the whole battery system.

TECHNICAL SOLUTION

According to an aspect of the present invention a removable battery component carrier is provided for accommodating a battery submodule comprising a plurality of battery cells. The removable battery component carrier comprises a bottom plate, a pair of side walls perpendicular to the bottom plate and extending from the bottom plate along two opposite longitudinal edges of the bottom plate, a pair of end plates perpendicular to the bottom plate and to the side walls and extending along two opposite transversal edges of the bottom plate, the end plates being mechanically coupled to the pair of side walls and/or to the bottom plate for fixing the plurality of battery cells together, a cell cover extending parallel to the bottom plate so that the cell cover, the bottom plate, the side walls and the end plates form an accommodating space for the battery submodule, and a cooling fin disposed between the plurality of battery cells.

Preferably, the cell cover is fixed to the side walls. The cell cover may be clamped between the battery cells and the side walls. The cell cover may be fixed to the side walls by means of screws. Preferably, the cell cover is a plastic cell cover.

The removable battery component carrier may further comprise a cell connection and sensing unit (CCU) for electrically and electronically connecting the battery cells in the battery submodule, wherein the battery cells are electrically interconnected by means of a parallel or series circuit and wherein the battery cells are electronically connected to the cell connection and sensing unit by means of voltage and temperature supervision of the cells.

The CCU comprises a supporting tray for carrying the cell connecting bus bars. Preferably, the CCU may also include a cell voltage and temperature supervision circuit and the necessary control wiring harness.

Preferably, the bottom plate and the side walls are made of an extruded aluminum profile, of a reinforced plastic extrusion profile or of rolled and welded steel carriers. The bottom plate and the side walls may be formed as a single piece.

Preferably, the end plates are made of an extruded aluminum profile, of an aluminum or steel deep drawn part, an aluminum casting part or a reinforced plastic extrusion profile or casting part.

Preferably, the bottom plate and/or the side walls comprise cooling channels for dissipating heat generated by the battery cells. Preferably, the cooling channels are designed to be connected to the cooling channels of adjacent removable battery component carriers.

According to an aspect of the present invention, a battery system comprises a carrier frame accommodating a plurality of removable battery component carriers, wherein each of the removable battery component carriers accommodates at least one battery submodule comprising a plurality of battery cells and wherein each of the removable battery component carriers is individually detachable from the carrier frame.

The battery system may further comprise an electronics component carrier accommodating a control electronics assembly and comprising signal and power ports.

Preferably, the carrier frame comprises coolant ports configured to be connected to the cooling channels of the removable battery component carriers.

Preferably, the carrier frame comprises two longitudinal segments and two transversal segments perpendicular to the longitudinal segments and connected to the longitudinal segments. The removable battery component carriers may comprise connection elements configured to be attached to the longitudinal segments or to the transversal segments of the carrier frame. The carrier frame may further comprise a central segment extending parallel to the longitudinal segments for reinforcing the carrier frame and dividing the accommodating space inside the carrier frame into two sub-spaces.

Preferably, the plurality of component carriers is mechanically interconnected via a plurality of bolts. Preferably, HV wiring harnesses are used for electrically connecting the electronics component carrier to the removable battery component carrier and/or to the battery submodule.

According to another aspect of the present invention, a vehicle including a battery system as defined above is provided.

Battery systems comprising removable carriers according to the present invention allow the separate removal of single battery submodules. Furthermore, each of the removable carriers is configured to be not only mechanically fixed to the battery system, but also to be electrically connected to the other battery submodules and the battery system and to build an overall cooling channel running through all submodules of the battery system.

Further aspects of the present invention could be learned from the dependent claims or the following description.

Advantageous Effects

According to embodiments of the present invention, it can be accomplished that easy assembly and disassembly of the battery system, easy repair of the battery module, and cost down for manufacturing of the battery system.

DESCRIPTION OF DRAWINGS

Features will become apparent to those of ordinary skill in the art by describing in detail exemplary embodiments with reference to the attached drawings in which.

BEST MODE

Figure 1:
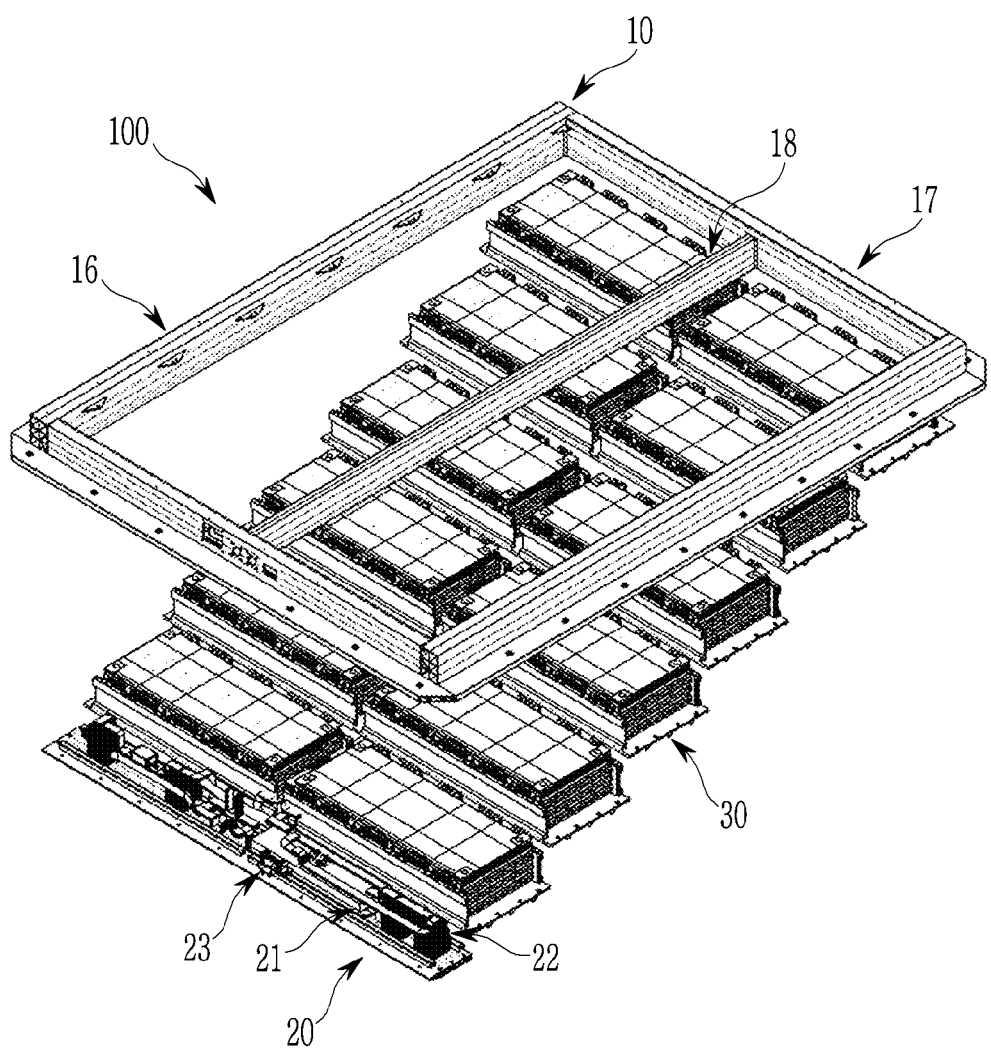
FIG. 1 illustrates an exploded perspective view of a battery system according to an embodiment of the present invention.

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and redundant descriptions are omitted.

In the following description of embodiments of the present invention, the terms of a singular form may include plural forms unless the context clearly indicates otherwise.

In the drawings, the sizes of elements may be exaggerated for clarity. For example, in the drawings, the size or thickness of each element may be arbitrarily shown for illustrative purposes, and thus the embodiments of the present invention should not be construed as being limited thereto.

Spatially relative terms, such as "upward," "downward," "upper", "lower", "under", "above" and the like, may be used herein for ease of explanation to describe the position of one element in relation to another element as illustrated in the figures. It will be understood that the spatially relative terms are intended to encompass different orientations of the device in use or in operation, in addition to the orientation depicted in the figures. For example, if the device in the figures is turned over, elements described as "below" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Referring to FIG. 1, an exemplary embodiment of a battery system 100 according to the present invention is illustrated. The battery system 100 comprises a carrier frame 10 accommodating a removable electronics component carrier 20 and a plurality of removable battery component carriers 30. According to the exemplary embodiment of FIG. 1 the carrier frame 10 accommodates six removable battery component carriers 30, but the number of removable battery component carriers 30 is not limited thereto.

Each of the removable battery component carriers 30 may comprise one or more battery submodules 40, each including a plurality of battery cells 1. According to the exemplary embodiment of FIG. 1 the removable battery component carrier 30 accommodates two battery submodules 40, but the number of battery submodules 40 is not limited thereto.

The carrier frame 10 comprises two longitudinal segments 16 and two transversal segments 17 forming a rectangular frame. One of the transversal segments 17 may comprise external signal ports configured to be connected to an external control unit (not shown) and an external power port configured to be connected to an external power circuit (not shown). The carrier frame may further comprise a central segment 18 extending parallel to the longitudinal segments 16 and dividing the accommodating space inside the carrier frame into two sub-spaces.

The electronics component carrier 20 comprises a bottom plate and a control electronics assembly 21 located on the bottom plate. The electronics component carrier 20 further comprises a signal port 22 for transmitting control signals between an external control circuit (not shown) and the control electronics assembly 21 and a power port 23 for electrically connecting the carrier frame 10 to an external power circuit (not shown), i.e. to a power circuit of a battery system, battery management system or directly to one or more electrical consumers.

Based on control signals, e.g. an actual power demand, the control electronics assembly 21 controls the battery submodules 40 on the battery component carriers 30 to provide an electric power that meets the actual demand. The control electronics assembly 21 is electrically connected to the electronics component carrier 20, that is electrically connected to the adjacent battery component carrier 30, which is electrically connected to the battery submodule 40 attached thereto and to the next adjacent battery component carrier 30 and so on. Via the electronical connection the control electronics assembly 21 transmits the signals for controlling the battery submodules 40. The electric current provided by the battery submodules 40 in response to these signals is transmitted via the electrical connection. Preferably the control signals are modulated on the currents or voltages between the electronics component carriers 20 and the battery component carriers 30 or battery submodules 40.

At a lower surface of the bottom plate of the electronics component carrier 20 cooling channels, through which a coolant may flow. The electronics component carrier 20 may be individually removable from the battery system 100, so that a replacement/repair of the control electronics assembly is simplified.

Figure 2:
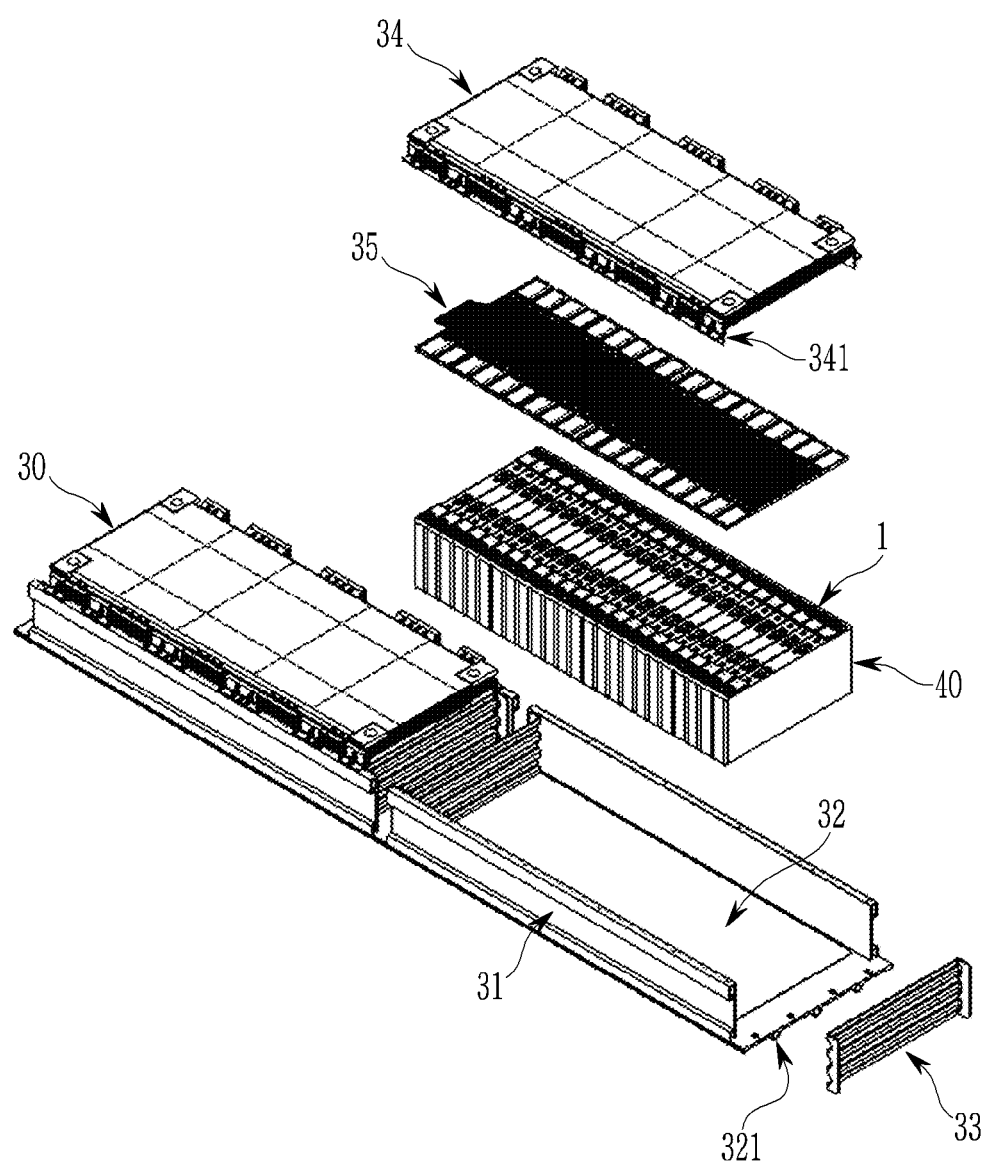
FIG. 2 illustrates an exploded perspective view of a removable battery component carrier according to an embodiment of the present invention.

Referring to FIG. 2, a removable battery component carrier 30 is shown, which is individually removable from the battery system 100. The battery component carrier 30 comprises connection elements (not shown) configured to be attached to corresponding connection elements of the longitudinal segments 16 of the carrier frame 10, e.g. screw holes, for fixing the battery component carrier 30 to the carrier frame 10. The battery component carrier 30 further comprises connecting elements (not shown) for electrically and electronically connecting the battery component carriers 30 to each other or to the electronics component carrier 20 within the battery system 100. For instance, the electrical connection may be realized with HV wiring harness or bus bars and the electronical connection may be realized via LV wiring harness, but the type of connections are not limited thereto.

The removable battery component carrier 30 comprises a bottom plate 32 and a pair of side walls 31 located at the longitudinal edges of the bottom plate 32 and extending in an upward direction from the bottom plate 32. In a preferred embodiment, the bottom plate 32 and the side walls 31 may be formed as a single piece. The bottom plate 32 and the side walls 31 may be made of an extruded aluminium profile, a reinforced plastic extrusion profile or they may be made of rolled and welded steel carriers comprising a bottom plate and walls.

Figure 3:
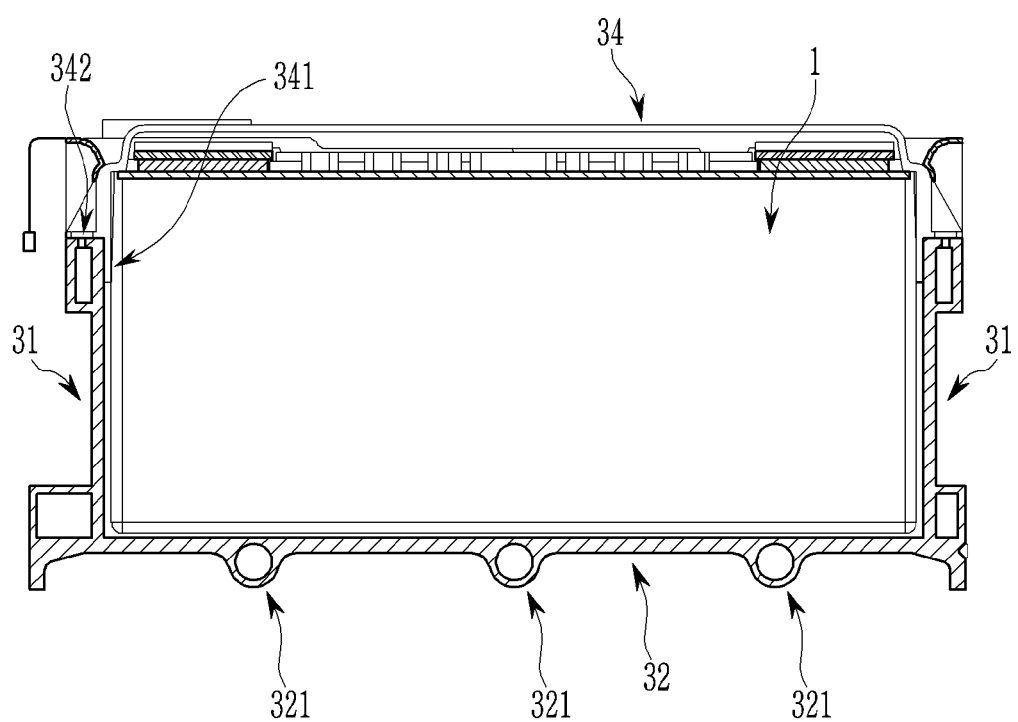
FIG. 3 illustrates a schematic cross section of the removable battery component carrier of FIG. 2.

The bottom plate 32 and the side walls 31 may include cooling channels independent of the cell direction. FIG. 3 shows three cooling channels 321 formed in the bottom plate 32. A coolant distribution line connected to external coolant ports arranged on the transversal segments 17 of the carrier frame 10 may be formed, which comprises a plurality of connecting pieces, wherein each connecting piece connects the coolant distribution line to one of the cooling channels 321 in the bottom plate 32 via a respective coolant port (not shown) of the respective battery component carrier 30. A coolant is then provided by an external coolant circuit (not shown) to the external coolant ports of the carrier frame 10. Via the coolant distribution line the coolant is provided to the coolant ports of the electronics component carrier 20 and the plurality of battery component carriers 30 and flows through the respective cooling channels 321 in the respective bottom plates 32 towards the opposing transversal segment 17 and along another coolant distributing line back to the other one of the external coolant ports.

Referring to FIG. 2, an exemplary embodiment of a battery submodule 40 includes a plurality of aligned secondary battery cells 1 with substantially planar shape. The battery cells 1 are assembled to a cell stack with a pair of end plates 33 provided on front surfaces of the outermost battery cells 1 and then mounted into the battery component carrier 30. Alternatively, one of the end plates 33 can be fixed to the side walls 31 and/or to the bottom plate 32 of the battery component carrier 30 first and then the battery cell stack is mounted into the battery component carrier 30. At last the second end plate 33 is fixed to the other elements of the battery component carrier 30. The battery cell stack can be preassembled in a longitudinal direction with the end plates 33, which may be provided on one or both front surfaces of the battery cell stack. The preassembly can be realized e.g. by means of an elastic element, a spring or a screw.

The end plates 33 are then mechanically coupled to the side walls 31 of the battery component carrier 30. The joining technology between the end plates 33 and the bottom plate 32 and side walls 31 of the battery component carrier 30 may be some kind of welding technology—e.g. friction stir welding or tungsten inert gas welding—clinching, screwing, riveting, wedging or gluing. Thereby the plurality of battery cells 1 is fixed together in a first (transversal)

direction by the side walls 31 and in a second (longitudinal) direction by the end plates 33.

The end plates 33 may be formed of an extruded aluminium profile, an aluminium or steel sheet metal, an aluminium casted part or a reinforced plastic extrusion profile or casted part.

The end plates 33 provide stiffness and mechanical stability to the battery submodule 40. The end plates 33 may also counteract swelling of the battery cells 1, in that the end plates 33 absorb and guide the swelling forces of the cells into the battery component carrier 30. Swelling of the battery cells 1 occurs due to the cell aging process.

According to the exemplary embodiment of FIG. 2, the removable battery component carrier 30 accommodates two battery submodules 40. In this case, the two end plates 33 located in the centre, between the two cell stacks, may be formed as a monolithic part. The monolithic central end plate may be an extruded aluminium profile, an aluminium casted part or a reinforced plastic extrusion profile or casted part. The monolithic centre end plate helps preventing a large cell swelling at the inner side of each cell stack, so that the cell swelling extension is diverted to the outer sides of each cell stack.

The battery cells 1 are further tightened in a third (vertical) direction by a cell cover 34 located on top of the battery cell stack. The cell cover 34 is fixed to the side walls 31 of the battery component carrier 30. For instance, the cell cover 34 may be clamped between the battery cells 1 and the side walls 31, e.g. the cell cover 34 may comprise a pair of clamps 341 located at a side portion of the cell cover 34 and extending in a downward direction, which are configured to be inserted between the battery cells 1 and the side walls 31. Additionally, the cell cover 34 may be fastened to the side walls 31, e.g. by means of screws 342 as shown in FIG. 3, or clipped in another way to the side walls 31 of the battery component carrier 30. The cell cover 34 does not only keep the battery cells in place but also has a touch protection function.

A cell connection and sensing unit (CCU) 35 including cell connectors, sensors and electronics may be provided between the cell cover 34 and the battery submodule 40. The CCU 35 includes a printed circuit board (PCB) with connection terminals to be connected to the terminals of the battery cells 1 and at least one semiconductor device formed on an upper surface of the circuit board. The circuit board also includes a wiring pattern (not shown) formed on a surface of the circuit board. A main body of the circuit board may be formed of a rigid electrically insulating material like polyimide (PI) or polyethylene (PET). The wiring pattern may be made of an electrically conductive material, such as copper (Cu), titanium (Ti), nickel (Ni), or palladium (Pd).

The semiconductor device is adapted to apply signals for controlling operations of the battery cells 1. In particular, the semiconductor device may control a charging or discharging extent through high current lines of the battery cells 1. In addition, the semiconductor device may apply signals indicating voltages, current and state of charge (SOC) of the battery cells 1 to prevent for example over-charge or over-discharge.

The CCU 35 comprises flexible HV and LV connecting parts to balance the cell extension and changing cell distances too. The CCU 35 comprises a main power path for interconnecting the cells and the plus/minus terminals via bus bars, voltage sensing lines for voltage sensing and cell balancing and their interconnection, temperature sensors for temperature supervision of the cells and their interconnection, and a light flexible carrier which fixes all components, provides easy automatic handling and is able to compensate the relative motion in case of cell breathing and cell swelling. Optionally, the CCU 35 may also comprise mounting possibilities for a cell supervision circuit (CSC-PCB).

The battery submodule 40 is mechanically fixed to the battery component carrier 30 by fixing elements. The battery submodule 40 is then tightly enclosed within the accommodating space. The battery submodule 40 may be additionally glued to the bottom plate 32 or to the side walls 31 for a further vertical fixation.

The removable battery component carrier 30 with the battery cells 1, endplates 33, cell cover 34 and further additional parts can be mounted into the carrier frame 10 of the battery system 100 so that it is separately removable, even when the battery system 100 is mounted inside the vehicle.

Figure 4:
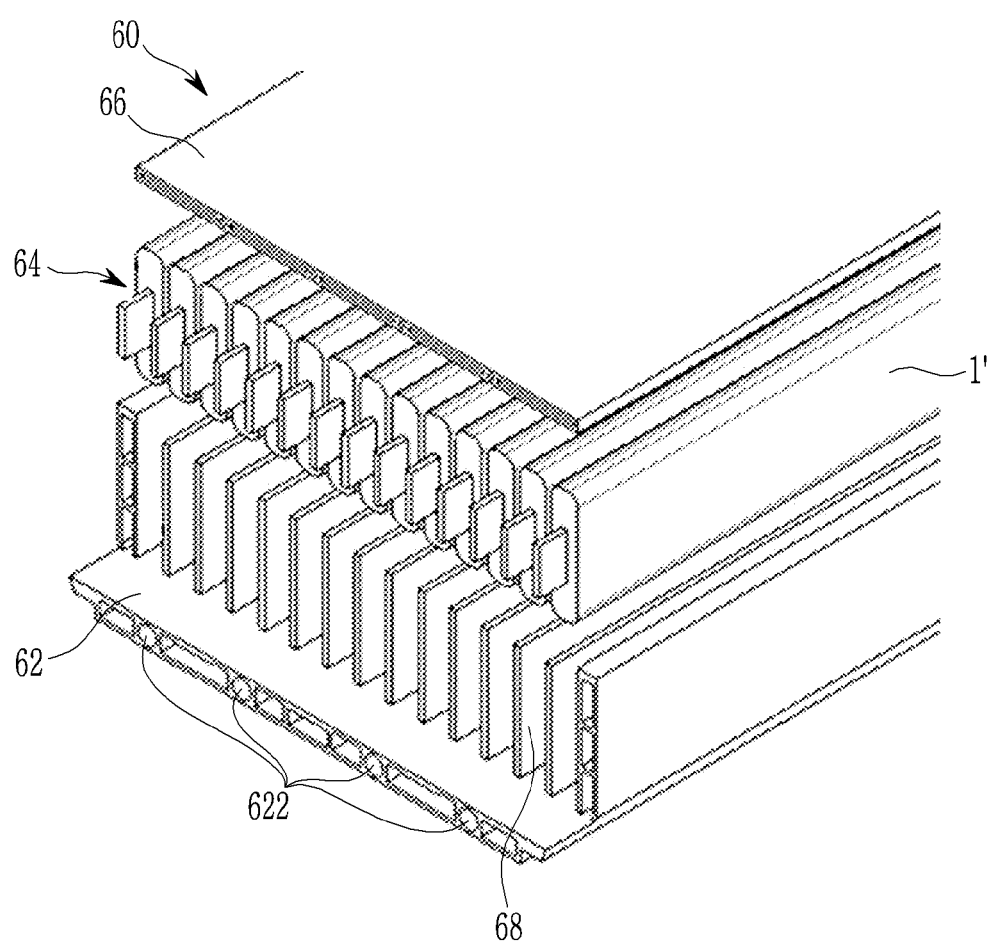
FIG. 4 illustrates a partially exploded perspective view of a removable battery component carrier according to another embodiment of the present invention.

FIG. 4 illustrates a partially exploded perspective view of a removable battery component carrier 60 according to another embodiment of the present invention.

The removable battery component carrier 60 has the same basic configuration as the removable battery component carrier described above. Thus, a bottom plate 62 is provided with cooling channels 622. Moreover, a cell cover 66 is disposed so as to opposite the bottom plate 62 in order to cover a battery submodule 64 accommodated in the removable battery component carrier 60. The cell cover 66 may be made of aluminum and may be connected to a cooling circuit (not shown).

The battery submodule 64 includes a plurality of secondary battery cells 1' and each cell 1' locates on the bottom portion 62 and has opposing wide surfaces are arranged along the longitudinal direction of the removable battery component carrier 60. A cooling fin 68 may be disposed between each of the cells 1'. The removable battery component carrier 60 may be made of an extruded aluminum profile or an aluminum casted part, such as the battery component carrier described above. The removable battery component carrier 60 can provide a more effective cooling action on the battery submodule 64 not only by the cooling channels 622, but by the cooling fin 68 and the cell cover 66 as well.

REFERENCE SIGNS 1, 1' secondary battery cell
10 carrier frame
16 longitudinal segment
17 transversal segment
18 central segment
20 removable electronics component carrier
21 control electronics assembly
22 signal/power port
30, 60 removable battery component carrier
31 side walls
32, 62 bottom plate
321, 622 cooling channel
33 end plate
34, 66 cell cover
341 cell cover clamp
342 screw
35 cell connection and sensing unit (CCU)
40, 64 battery submodule
68 cooling fin
100 battery system

The invention claimed is:

1. A removable battery component carrier for accommodating a battery submodule comprising a plurality of battery cells and configured to be mechanically and electrically connected to other removable battery component carriers and/or to a carrier frame to form a modular battery system, the removable battery component carrier comprising:
- a bottom plate comprising cooling channels for dissipating heat from the battery cells, the cooling channels extending in a longitudinal direction of the bottom plate;
- a pair of side walls perpendicular to the bottom plate and extending along two opposite longitudinal edges of the bottom plate;
- a pair of end plates perpendicular to the bottom plate and to the side walls and extending along two opposite transversal edges of the bottom plate, the end plates being mechanically coupled to the pair of side walls and/or to the bottom plate or fixing the plurality of battery cells together;
- a cell cover extending parallel to the bottom plate so that the cell cover, the bottom plate, the side walls and the end plates form an accommodating space for the battery submodule, and
- a cooling fin extending between the plurality of battery cells in the longitudinal direction of the bottom plate.

2. The removable battery component carrier according to claim 1,
wherein the cell cover is fixed to the side walls.

3. The removable battery component carrier according to claim 2,
wherein the cell cover is adapted to be clamped between the battery cells and the side walls.

4. The removable battery component carrier according to claim 2,
wherein the cell cover is fixed to the side walls by means of screws.

5. The removable battery component carrier according to claim 1,
wherein the cell cover is a plastic cell cover.

6. The removable battery component carrier according to claim 1,
further comprising a cell connection and sensing unit located between the cell cover and the battery submodule.

7. The removable battery component carrier according to claim 1,
wherein the bottom plate and the side walls are made of an extruded aluminum profile, of a reinforced plastic extrusion profile or of rolled and welded steel carriers.

8. The removable battery component carrier according to claim 1,
wherein the end plates are made of an extruded aluminum profile, of an aluminum or steel deep drawn part, an aluminum casting part or a reinforced plastic extrusion profile or casting part.

9. The removable battery component carrier according to claim 1,
wherein the side walls comprise cooling channels for dissipating heat from the battery cells.

10. A battery system, comprising:
a carrier frame accommodating a plurality of removable battery component carriers according to claim 1,
wherein each of the removable battery component carrier accommodates at least one battery submodule comprising a plurality of battery cells and is individually detachable from the carrier frame.

11. The battery system according to claim 10, further comprising:
an electronics component carrier accommodating a control electronics assembly and comprising a signal port and a power port.

12. The battery system according to claim 11,
wherein the plurality of removable battery component carriers is mechanically interconnected via a plurality of bolts, and
further comprising one or more bus bars electrically connecting the electronics component carrier to the removable battery component carrier and the removable battery component carriers to each other.

13. The battery system according to claim 10,
wherein the carrier frame comprises two longitudinal segments and two transversal segments perpendicular to the longitudinal segments and connected to the longitudinal segments; and
wherein the removable battery component carriers comprise connection elements configured to be attached to the longitudinal segments or to the transversal segments.

14. A vehicle including a battery system according to claim 10.

15. The battery system according to claim 10,
wherein the carrier frame comprises coolant ports configured to be connected to cooling channels of the removable battery component carriers.

* * * * *